United States Patent [19]

Kurata et al.

[11] Patent Number: 5,012,339
[45] Date of Patent: Apr. 30, 1991

[54] FIELD DISCRIMINATION CIRCUIT

[75] Inventors: Takatsugu Kurata, Ibaraki; Takuya Nishide, Osaka, both of Japan

[73] Assignee: Matsushita Electric Industrial Co., Ltd., Osaka, Japan

[21] Appl. No.: 425,107

[22] Filed: Oct. 23, 1989

[30] Foreign Application Priority Data

Oct. 28, 1988 [JP] Japan .................. 63-273549

[51] Int. Cl.$^5$ .............................................. H04N 5/04
[52] U.S. Cl. ..................................... 358/148; 358/158
[58] Field of Search .................... 358/148, 158, 236

[56] References Cited

U.S. PATENT DOCUMENTS 4,694,348  9/1987  Kamiya et al. .
4,701,799 10/1987  Yoshimura .
4,792,853 12/1988  Yamagishi et al. .
4,792,857 12/1988  Akiyama .

Primary Examiner—James J. Groody
Assistant Examiner—David E. Harvey
Attorney, Agent, or Firm—Stevens, Davis, Miller & Mosher

[57] ABSTRACT

A field discrimination circuit for use in a television receiver, which includes a shift register for shifting an input vertical synchronizing signal so as to produce n ($n \geq 6$) pseudo vertical synchronizing signals having the same phase difference, a selector for selecting one of the n pseudo vertical synchronizing signals and delivering the selectd pseudo vertical synchronizing signal as a reference vertical synchronizing signal, a latch circuit for detecting input timing of the reference vertical synchronizing signal into one of n time sections obtained by dividing one horizontal scanning period by n, to thereby generate a latch output signal, and a decoder for effecting field discrimination on the basis of the latch output signal and generating a field discrimination signal.

3 Claims, 6 Drawing Sheets

FIELD DISCRIMINATION CIRCUIT

BACKGROUND OF THE INVENTION

1. Field of the Invention

This invention relates to a field discrimination circuit used in a display signal processing circuit such as that incorporated in, for example, picture display apparatus (especially, various kinds of flat panel displays, liquid crystal displays and plasma displays) in which individual picture elements or individual scanning lines are fixed on a screen.

2. Description of the Related Art

First, a method for driving a picture display device will be briefly described.

FIG. 1 is a schematic plan view of an example of known picture display devices 50 employed in the present invention. The illustrated picture display device 50 can display 440 scanning lines $l_1$ to $l_{440}$. The odd-numbered scanning lines $l_1, l_3, \ldots, l_{439}$ are those belonging to a second field, while the even-numbered scanning lines $l_2, l_4, \ldots, l_{440}$ are those belonging to a first field.

FIG. 2 is a block diagram showing a circuit related to field discrimination in a drive circuit used for driving such a prior art picture display device 50. This drive circuit includes a decoder/vertical driver 51, a vertical address counter 52 and a latch circuit 53 for the field discrimination purpose. The vertical address counter 52 generates count data synchronous with a horizontal synchronizing signal H. The decoder/vertical driver 51 reads out vertical deflection data corresponding to the count data from a memory (not shown) and decodes the vertical deflection data to supply the decoded data to a vertical deflection electrode unit (not shown). The vertical address counter 52, which is reset by a vertical synchronizing signal Vin, counts the pulses of the horizontal synchronizing signal H. The field discrimination latch circuit 53 receives a signal $H_F$ with the timing of the vertical synchronizing signal Vin applied as a clock signal. The field discrimination latch circuit 53 generates a field discrimination output signal FLD which is applied to an LSB (least significant bit) terminal of the decoder/vertical driver 51.

FIG. 3 is a timing chart for illustrating the operation of the drive circuit shown in FIG. 2. In FIG. 3, $S_P$ designates a picture signal of a first field, and $S_S$ designates a picture signal of a second field. The horizontal synchronizing signal H has a pulse internal of one horizontal scanning period, and the signal $H_F$ applied to the field discrimination latch circuit 53 has also a pulse internal of one horizontal scanning period for the purpose of field discrimination. The duty factor of this pulse signal $H_F$ is 50%. The field discrimination output signal FLD of the latch 53 has a waveform as shown in FIG. 3. Va, Vb, Vc and Vd represent four different forms of the vertical synchronizing signal Vin. That is, these signals Va to Vd have different delay times attributable to, for example, variations of the constants of a vertical hold circuit (not shown). Of course, an inverse interlace or an interlace stop should not occur regardless of application of the vertical synchronizing signal Vin having whatever delay time. The numerals appearing beneath the waveforms of the vertical synchronizing signals Va to Vd indicates the counts of the vertical address counter 52.

The operation of the prior art drive circuit driving the known picture display device 50 will now be described with reference to FIGS. 2 and 3. For the purpose of description, it is supposed that the decoder/vertical deriver 51 is designed so that display of a picture is started from the time where the count of the vertical address counter 52 is "20".

First, a description will be directed to the case where the vertical synchronizing signal Vin is represented by Va. In the case of the first field, the vertical synchronizing signal Va is applied with the timing where the signal $H_F$ is in its "L" level. As a result, the field discrimination output signal FLD of the latch 53 is turned into its "L" level. Further, when the screen is scanned with the scanning line $l_2$, a picture signal portion corresponding to the count "20" of the vertical address counter 52, that is, a picture signal portion ② is displayed on the screen. Similarly, a picture signal portion ∝ is then displayed when the screen is scanned with the scanning line $l_4$.

In the case of the second field, the vertical synchronizing signal Va is applied with the timing where the signal $H_F$ is in its "H" level. As a result, the field discrimination output signal FLD of the latch circuit 53 is turned into its "H" level, and a picture signal portion ① and a picture signal portion ③ are sequentially displayed when the screen is scanned with the scanning lines $l_1$ and $l_3$ respectively. Such a display mode is shown in FIG. 4 (a).

Description will then be directed to the case where the vertical synchronizing signal Vb is applied. In the first field, the field discrimination output signal FLD of the latch circuit 53 is turned into its "H" level, and the picture signal portions ② and ④ are sequentially displayed when the screen is scanned with the scanning lines $l_1$ and $l_3$ respectively. On the other hand, in the second field, the field discrimination output signal FLD of the latch circuit 53 is turned into its "L" level, and the picture signal portions ③ and ⑤ are sequentially displayed when the screen is scanned with the scanning lines $l_2$ and $l_4$ respectively. Such a display made is shown in FIG. 4 (b).

Display modes, when the vertical synchronizing signals Vc and Vd are similarly applied, are shown in FIG. 4 (c) and 4 (d) respectively.

Thus, when the field is discriminated in the manner described above, a normal interlaced picture can be displayed regardless of the value of a delay in the vertical synchronizing signal separation circuit.

When, in the field discrimination circuit included in the drive circuit described above, the vertical synchronizing signal Vin is applied to the decoder/vertical driver 51 while the level of the signal $H_F$ is changing, the decoder/vertical driver 51 may not detect such a level change of the signal $H_F$ or may be unable to specify the field, resulting in a variation of its output. As a result, the decoder/vertical driver 51 may be unable to ensure the interlacing operation, or its driving operation may become unstable.

SUMMARY OF THE INVENTION

With a view to obviate such a malfunction or unstable operation of the prior art field discrimination circuit, it is an object of the present invention to provide a field discrimination circuit for use in a drive circuit driving a picture display device, in which a pull-in function is added to the prior art field discrimination circuit so as to always ensure the stable interlacing operation.

The field discrimination circuit according to the present invention comprises a shift register of at least six bits which is shifted by a pulse string having one pulse in each of time sections which are obtained by equally dividing one horizontal scanning period into at least six time sections, a selector for selecting one vertical synchronizing signal from at least six vertical synchronizing signals which are shifted by the shift register, means for detecting the phase of the vertical synchronizing signal selected by the selector, that is, detecting at which timing of the time section the selected vertical synchronizing signal has been inputted, a decoder for performing field discrimination in accordance with a result of the phase detection, and a state machine for altering the mode of selection of the vertical synchronizing signal by the selector in accordance with a result of the phase detection.

As will be apparent from the above description of the operation of the prior art field discrimination circuit (the drive circuit), it is known that even the prior art field discrimination circuit can stably operate so far as the vertical synchronizing signal Vin is not applied to the decoder at a timing in the vicinity of a level change point of the signal $H_F$. The field discrimination circuit of the present invention can ensure the stable interlacing operation even when a vertical synchronizing signal is applied at a timing in the vicinity of a level change point of the signal $H_F$, because a vertical synchronizing signal which is inputted at a timing of the center portion of a pulse of the signal $H_F$ is always selected by the selector from among the six vertical synchronizing signals shifted by the shift register.

On the other hand, in order that whether the signal being received is interlaced or not interlaced can be accurately detected, it is necessary to divide one horizontal scanning period into at least six time sections. That is, if the possibility of occurrence of malfunction of the field discrimination circuit is estimated beforehand to be within the range of ± 1, it is necessary to divide one horizontal scanning period into at least six time sections in total in which three time sections therein represent the non-interlaced state, while the remaining three time sections represent the interlaced state. This principle will now be described in further detail.

In a picture signal used in a television system, the phase of a first field and that of a second field have a difference corresponding to $\frac{1}{2}$ of one horizontal scanning period. Therefore, when the signal received is interlaced, if the vertical synchronizing signal is inputted at time $t_1$ in the first field, then, the vertical synchronizing signal is inputted at time $t_1 + \frac{1}{2}$ H in the second field, where H denotes a pulse internal of one horizontal scanning period.

In order that such input timing of the vertical synchronizing signal can be detected correctly by a gate circuit, a best method for detecting the input timing of the vertical synchronizing signal is to divide one horizontal scanning period H into, for example, six time sections and to have the vertical synchronizing signal inputted at a timing of substantially the middle of the second time section and at that of the fifth time section. This is because the desired stable input timing of the vertical synchronizing signal can be accurately detected by using the pulse signal H, which provides the basis for determining the timing in one horizontal scanning period, while taking into consideration any possible malfunction of the field discrimination circuit.

On the other hand, when the received signal is not interlaced, the vertical synchronizing signal for each of the first and second fields may be applied at substantially the same timing in one horizontal scanning period.

DESCRIPTION OF THE PREFERRED EMBODIMENT

A preferred embodiment of the field discrimination circuit according to the present invention will now be described with reference to FIGS. 5 to 7b.

Figure 5:
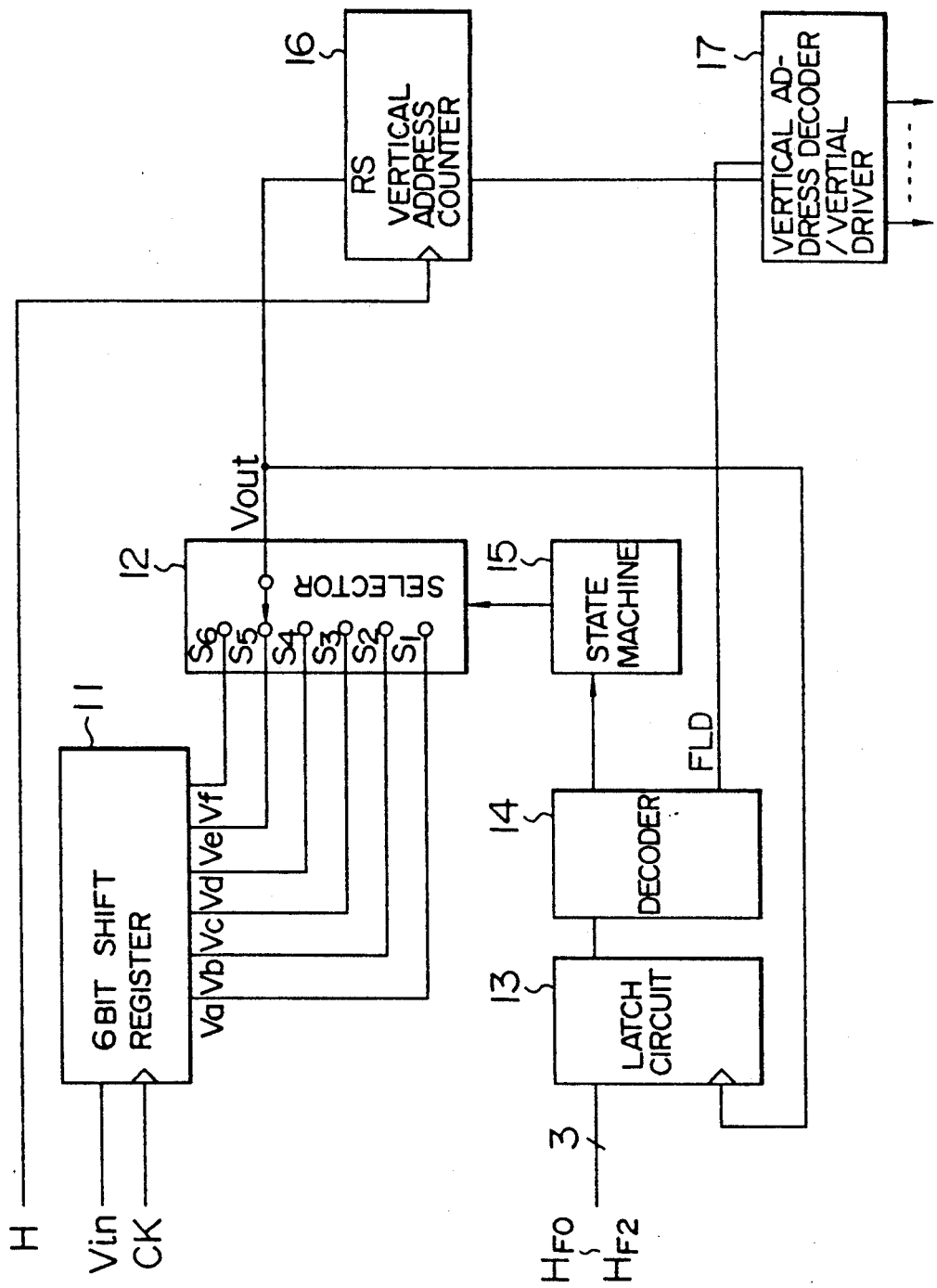
FIG. 5 is a block diagram of a preferred embodiment of the field discrimination circuit according to the present invention.

FIG. 5 is a block diagram of the field discrimination circuit embodying the present invention. Referring to FIG. 5, the field discrimination circuit comprises a 6-bit shift register 11, a selector 12, a latch circuit 13, a decoder 14, a state machine 15, a vertical address counter 16, and a vertical address decoder/vertical driver 17. The shift register 11 has a structure as, for example, shown in FIG. 7b.

The field discrimination circuit and vertical driver circuit having the above structure will be described in further detail with reference to FIG. 6.

Figure 6:
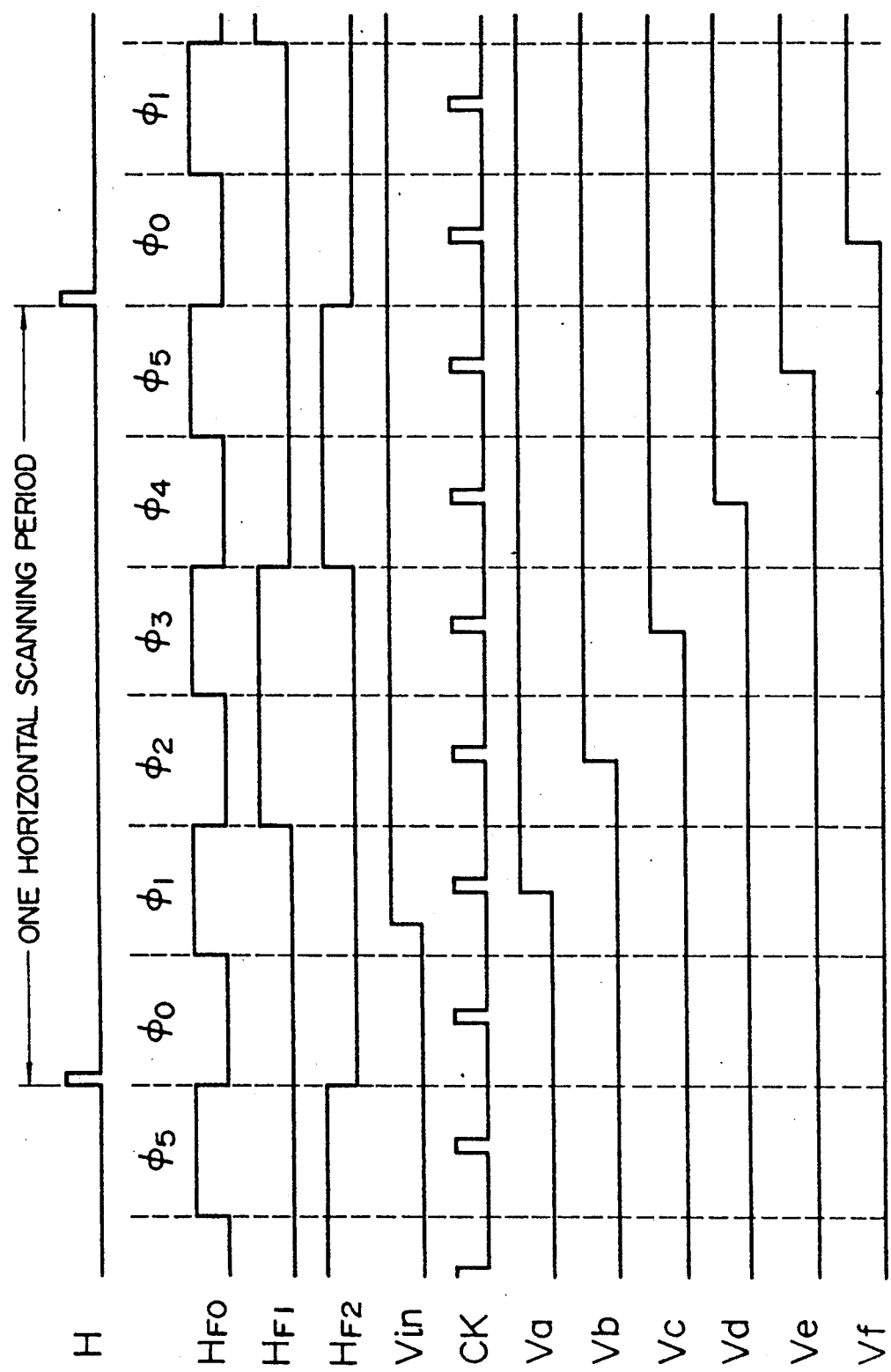
FIG. 6 is a timing chart for illustrating the operation of the field discrimination circuit of the present invention shown in FIG. 5.

As shown in FIG. 6, one horizontal scanning period is equally divided into six time sections, $\phi_0, \phi_1, \ldots, \phi_5$ and each of these six time sections is identified by the use of the combination of 3-bit signals $H_{F0}$, $H_{F1}$ and $H_{F2}$. These signals $H_{F0}$, $H_{F1}$ and $H_{F2}$ can be obtained by applying an oscillator output signal having a frequency higher than the horizontal frequency to a counter (not shown) and decoding the output signal of the counter. The six individual time sections obtained by dividing one horizontal scanning period are designated as $\phi_0, \phi_1, \ldots, \phi_5$, respectively, as described above. A pulse string CK having one pulse in each of the six time sections is applied, together with a vertical synchronizing signal Vin, to the shift register 11, and the vertical synchronizing signal Vin is shifted to form six kinds of vertical synchronizing signals Va, Vb, Vc, Vd, Ve and Vf synchronous with the pulse string input CK. This pulse string input CK can also be produced by means similar to the means used for producing the signals $H_{F0}$ to $H_{F2}$.

The six vertical synchronizing signals Va, Vb, Vc, Vd, Ve and Vf are applied to six input terminals $S_1$, $S_2$, $S_3$, $S_4$, $S_5$ and $S_6$ respectively of the selector 12, and one of those vertical synchronizing signals Va to Vf is selected to appear as an output signal $V_{OUT}$ from the selector 12. This selection of one of the six vertical synchronizing signals Va to Vf is determined by the state machine 15 which can take six operable states or modes $\sigma_1$, $\sigma_2$, $\sigma_3$, $\sigma_4$, $\sigma_5$ and $\sigma_6$. In response to the application of the one vertical synchronizing signal selected by the selector 12, the latch circuit 13 latches the 3-bit signals $H_{F0}$ to $H_{F2}$. When the state machine 15 takes the operable mode $\sigma_1$, the selector 12 selects the vertical synchronizing signal Va applied to its input terminal $S_1$. Similarly, when the state machine 15 takes the operable modes $\sigma_2$, $\sigma_3$, $\sigma_4$, $\sigma_5$ and $\sigma_6$, the vertical synchronizing signals Vb, Vc, Vd, Ve and Vf applied to the selector input terminals $S_2$, $S_3$, $S_4$, $S_5$ and $S_6$ are selected respectively. The decoder 14 decodes the output signal of the latch circuit 13 and generates an output signal which controls the state machine 15. The decoder 14 also generates a field discrimination output signal FLD. On the basis of the output signal of the decoder 14, the state machine 15 controls the change-over of the input terminals $S_1$ to $S_6$ of the selector 12. The vertical address counter 16 and the vertical address decoder/vertical driver 17 are similar to those shown in FIG. 2.

The operation of the field discrimination circuit will now be described with reference to FIGS. 6, 7a and 7b.

First, a description will be directed to the case where the application timing of the selected vertical synchronizing signal Vin corresponds to the time section $\phi_0$ ($H_{F0}$="L", $H_{F1}$="L", $H_{F2}$="L"), that is, $\phi_0$ (0, 0, 0) or time section $\phi_3$ ($H_{F0}$="H", $H_{F1}$="H", $H_{F2}$="L"), that is, $\phi_3$ (1, 1, 0). In this case, the state of the state machine 15 is changed or incremented by a mode "1" by the function of the decoder 14. If the state machine 15 was placed in the mode $\sigma_6$ already, the state transition from the mode $\sigma_6$ to the mode $\sigma_4$ occurs in this case. Therefore, there is a very high possibility that application timing of the vertical synchronizing signal Vin which will be selected next time will correspond to the time section $\phi_4$ or $\phi_1$ shown in FIG. 6. That is, the vertical synchronizing signal Va or Vd will be selected next time.

On the other hand, when the application timing of the selected vertical synchronizing signal Vin corresponds to the time section $\phi_1$ (0, 0, 0) or $\phi_4$ (0, 0, 1), the decoder 14 does not act to change the state of the state machine 15. Therefore, there is a very high possibility that application timing of the vertical synchronizing signal Vin which will be selected next will correspond to the time section $\phi_4$ or $\phi_1$ shown in FIG. 6.

When the application timing of the selected vertical synchronizing signal Vin corresponds to the time section $\phi_2$ (0, 1, 0) or $\phi_5$ (1, 0, 1), the state of the state machine 15 is decremented by a mode "1" by the function of the decoder 14. If the state machine 15 was placed in the mode $\sigma_1$ already, the state transition from the mode $\sigma_1$ to the mode $\sigma_3$ occurs in this case. Therefore, there is a very high possibility that application timing of the vertical synchronizing signal Vin which will be selected next will correspond to the time section $\phi_4$ or $\phi_1$. In the manner described above, regardless of the application timing of the vertical synchronizing signal, the selected vertical synchronizing signal is caused to have the timing corresponding to the time section $\phi_1$ or $\phi_4$ where the field can be discriminated stably.

Figures 7A, 7B:
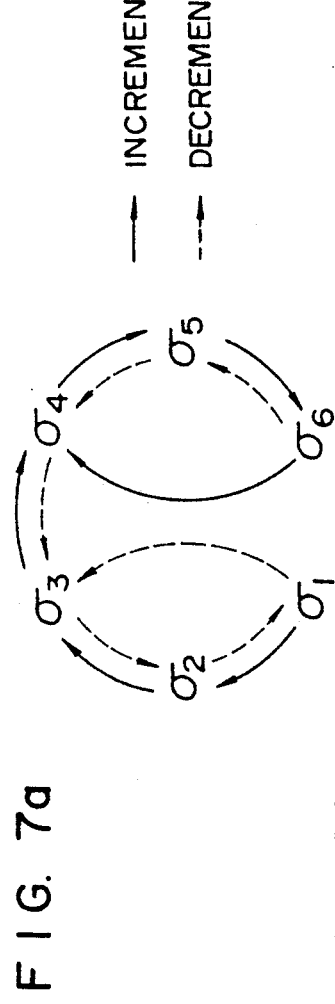
FIG. 7a is a conceptional diagram for illustrating the state transition in the state machine shown in FIG. 5.
FIG. 7b is a block diagram showing in detail the structure of the shift register and selector shown in FIG. 5.

FIG. 7a shows the state transition in the state machine 15, and FIG. 7b shows the detailed structure of the shift register 11 and that of the selector 12.

The field discrimination signal FLD of "L" level is generated from the decoder 14 when the selected vertical synchronizing signal Vin has the timing corresponding to the time section $\phi_0$, $\phi_1$ or $\phi_2$, while the field discrimination signal FLD of "H" level is generated when the selected vertical synchronizing signal Vin has the timing corresponding to the time section $\phi_3$, $\phi_4$ or $\phi_5$.

Figure 1:
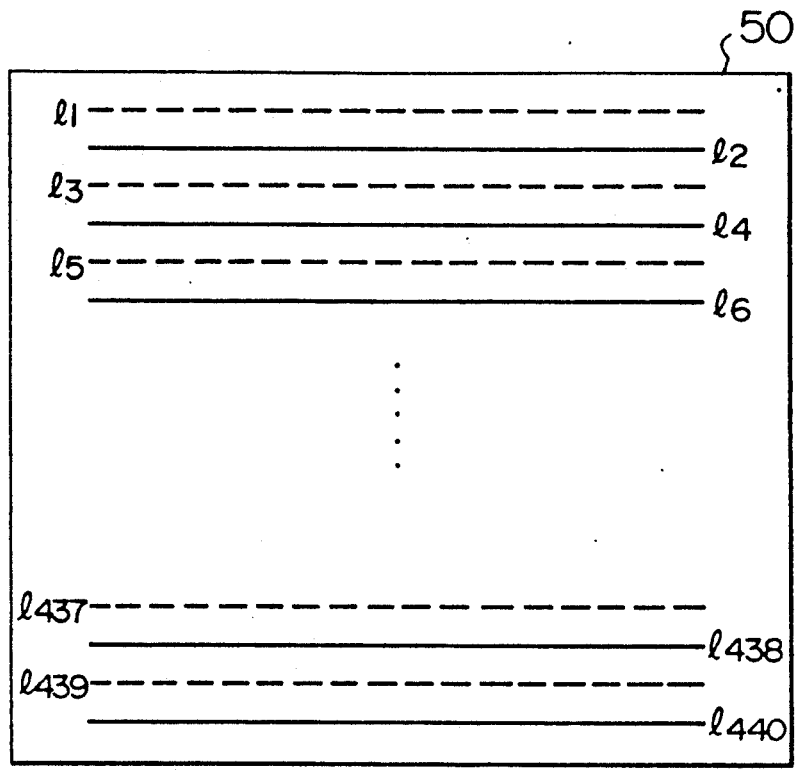
FIG. 1 is a schematic plan view for illustrating the order of scanning lines for scanning the screen of a picture display device.
Figure 2:
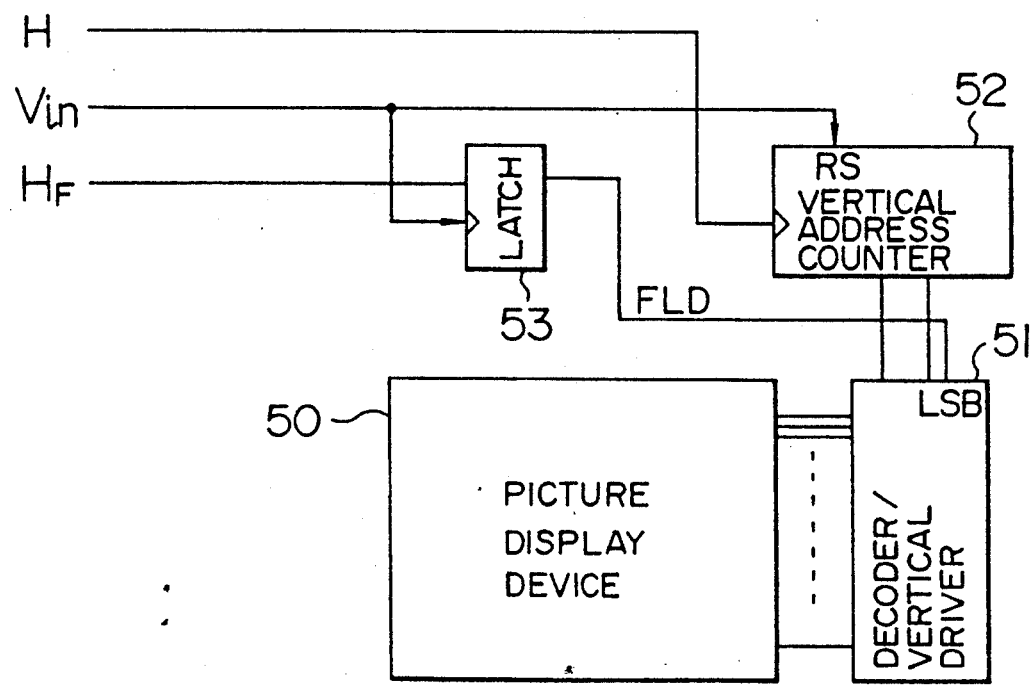
FIG. 2 is a block diagram of a field discrimination circuit incorporated in a drive circuit used for driving the picture display device shown in FIG. 1.
Figure 3:
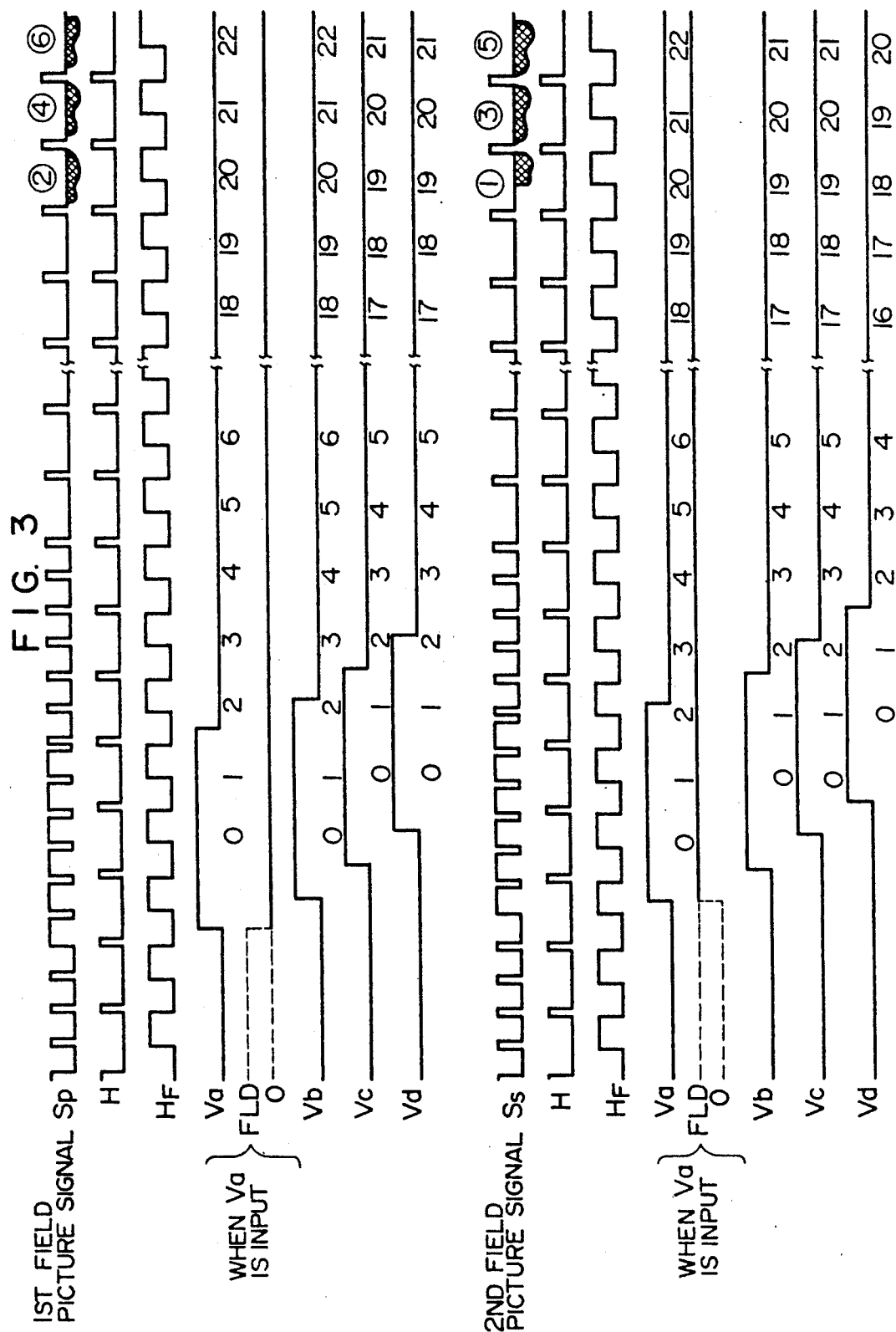
FIG. 3 is a timing chart for illustrating the operation of the prior art field discrimination circuit shown in FIG. 2.
Figure 4:
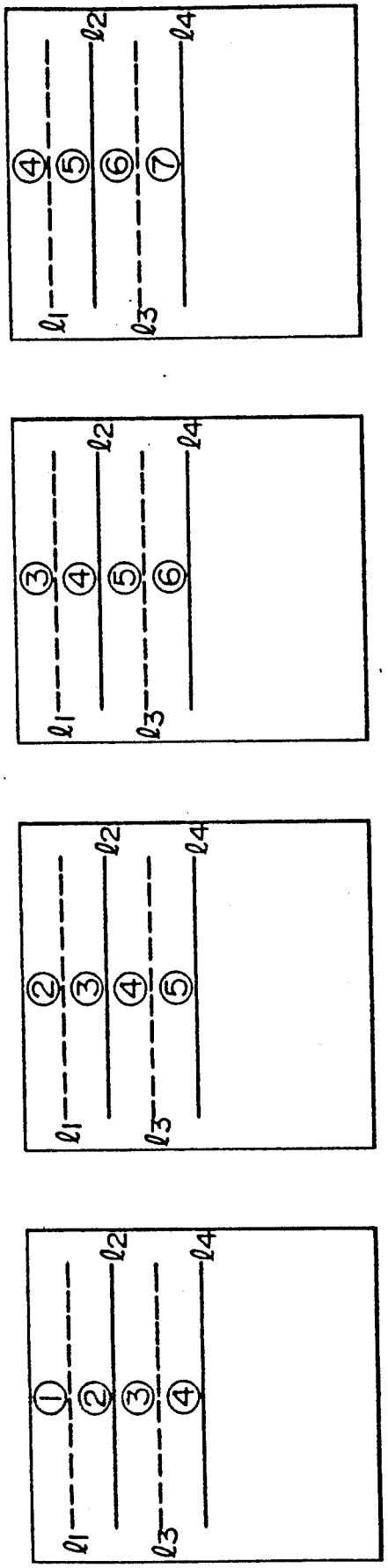
FIG. 4 (a-d) are conceptional diagrams showing various picture display modes changing due to changes in the phase of the vertical synchronizing pulses.

The functions of the vertical address counter 16 and the vertical address decoder/vertical driver 17 are similar to those of the vertical address counter 52 and the decoder/vertical driver 51 shown in FIG. 2.

It will be understood from the foregoing description that, in the field discrimination circuit according to the present invention, the stable vertical synchronizing signal selected by the selector is used for field discrimination, so that any malfunction as well as any unstable operation of the field discrimination circuit can be completely prevented regardless of the application timing of the vertical synchronizing signal.

We claim:

1. A field discrimination circuit comprising:
a shift register of at least six bits for shifting a vertical synchronizing signal Vin by at least six pulses within one horizontal scanning period;
a selector for selecting one vertical synchronizing signal from at least six vertical synchronizing signals shifted by said shift register;
a phase detector for detecting the phase of the vertical synchronizing signal selected by said selector; and
a decoder and a state machine for performing field discrimination and further altering the selection of the vertical synchronizing signal by said selector in accordance with the phase of the vertical synchronizing signal selected by said selector.

2. A field discrimination circuit comprising:
a shift register receiving, as input signals thereto, a vertical synchronizing signal and a clock signal in the form of a pulse string including at least n (n≧6) pulses within one horizontal scanning period and having a pulse interval of a predetermined time interval, said shift register shifting said input vertical synchronizing signal in synchronism with said clock signal to thereby produce n pseudo vertical synchronizing signals having a phase difference corresponding to said predetermined time interval;
a selector receiving, as input signals thereto, said n pseudo vertical synchronizing signals produced by said shift register, selecting one of said pseudo vertical synchronizing signals, and outputting said selected pseudo vertical synchronizing signal as a reference vertical synchronizing signal;
a latch circuit receiving, as input signals thereto, said reference vertical synchronizing signal outputted from said selector and information signals indicating individual time sections obtained by equally dividing one horizontal scanning period by n, said latch circuit generating a latch output signal indicating in which one of said n time sections said reference vertical synchronizing signal has been inputted; and
a decoder receiving, as an input signal thereto, said latch output signal from said latch circuit, and, when said latch output signal does not indicate a first or a second predetermined time section among said n time sections, generating a control signal for controlling the selection of said selector so that said latch output signal indicates said first or second predetermined time section, said decoder performing field discrimination depending on said latch output signal indicating in which one of said first and second predetermined time sections said reference vertical synchronizing signal has been inputted, and generating a field discrimination signal as a result of said field discrimination.

3. A field discrimination circuit as in claim 1, wherein the state machine is capable of assuming at least six modes each corresponding respectively to one of the at least six vertical synchronization signals shifted by the shift register, the selector is controlled by the decoder and the state machine to select one of the vertical synchronization signals shifted by the shift register in response to the particular one of said modes presently assumed by the state machine, and the decoder shifts the mode assumed by the state machine in response to a first predetermined application timing of a previously selected one of the vertical synchronization signals shifted by the shift register to control the mode assumed by the state machine so as to cause a next selected one of the vertical synchronization signals shifted by the shift register to correspond to a second predetermined application timing to enable stable field discrimination independently of the application timing of the original vertical synchronization signal $V_{in}$.

* * * * *